United States Patent Office 3,492,030
Patented Jan. 27, 1970

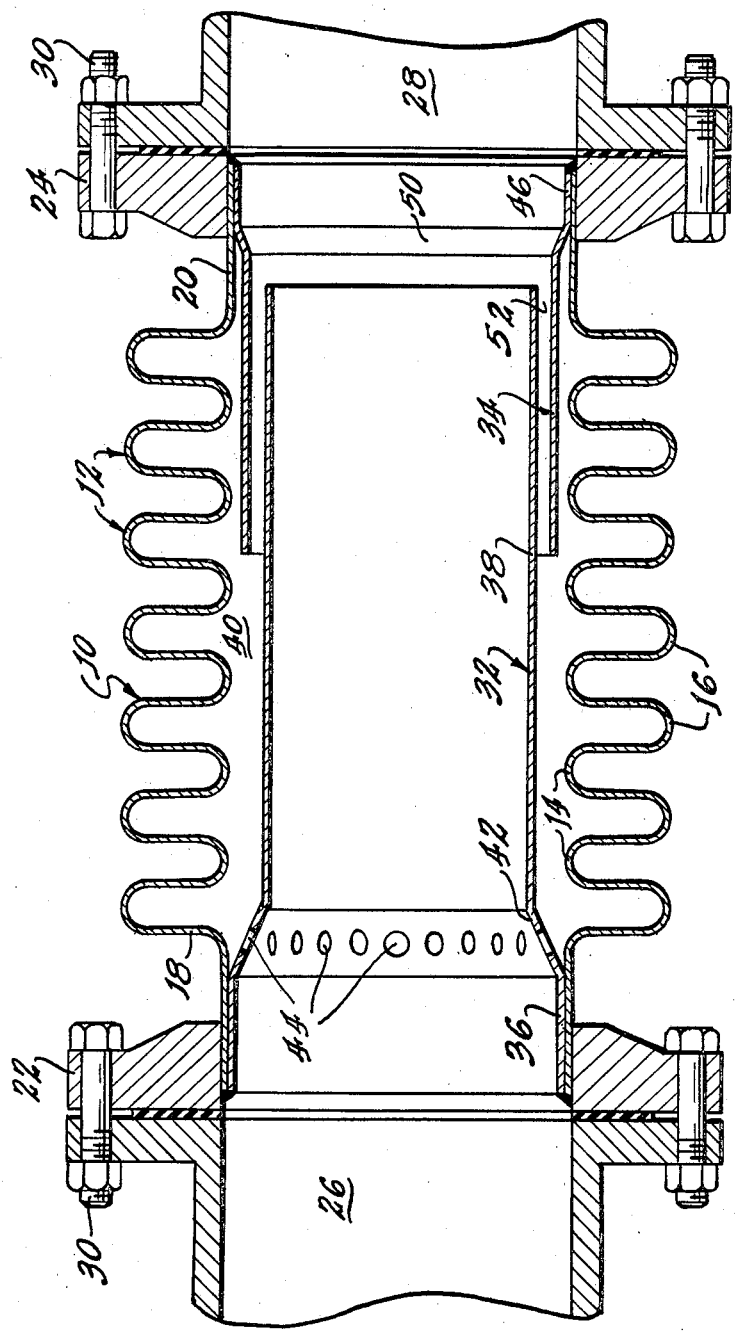

3,492,030
BELLOWS LINER
Charles W. Harrison, Pasco, and Edward A. Lund, Richland, Wash., assignors to the United States of America as represented by the United States Atomic Energy Commission
Filed Sept. 23, 1968, Ser. No. 761,471
Int. Cl. F16l 27/12
U.S. Cl. 285—300                                    2 Claims

ABSTRACT OF THE DISCLOSURE

An assembly consisting of a bellows and two inner liners, each end of the bellows having a liner attached thereto, the liners being so arranged that a portion of the fluid passing through the assembly will flow into a space formed between one liner and the bellows and out an annular opening between the two liners, thereby removing any gas which may be trapped between the liners and the bellows.

CONTRACTUAL ORIGIN OF THE INVENTION

The invention described herein was made in the course of, or under, a contract with the United States Atomic Energy Commission.

BACKGROUND OF THE INVENTION

This invention relates to an expandable and contractable assembly for connecting containers carrying hot fluids.

The movement of fluids, particularly fluids having high temperatures, presents many problems due to the expanding and contracting of the piping systems because of the variation of the temperatures of the fluids being carried. This expanding and contracting movement of the piping system requires the use of expansion components in the system to prevent cracking and breakage of the piping system which would cause leakage and loss of the fluid.

One type of commonly used flexible connection consists of a flexible bellows connecting two containers. One end of the bellows contains a tubular inner liner which extends through the bellows to direct the flow of fluid through the bellows from one pipe to the other. Some difficulties have been experienced with this type of arrangement in that gases such as air, or, in the case of hot water, steam may collect behind the liner in the corrugations of the bellows. This unsymmetrically lessens the liquid envelope around the liner and causes severe unbalanced vibrations to occur in the liner which are then transmitted to the bellows corrugations. These vibrations may result in failure of both the liner and the bellows.

SUMMARY OF THE INVENTION

The assembly of the present invention comprises a hollow expanso-contractable member or bellows and two tubular inner liners, each end of the bellows having a liner attached thereto. The liners are of such diameter that an annular chamber is formed between the liners and the bellows. The first liner contains passages to permit the flow of fluid from the interior of the liner into the annular chamber. The other liner overlaps and surrounds the first liner in a spaced relation, forming an annular space between the liners through which the fluid in the annular chamber may flow into the second liner.

BRIEF DESCRIPTION OF THE DRAWING

The single figure is a longitudinal sectional view of the assembly of the present invention.

DESCRIPTION OF THE PREFERRED EMBODIMENT

The assembly of the present invention comprises a hollow expanso-contractable member 10 and two tubular inner liners 32 and 34. Hollow member 10 has a long transversely corrugated portion 12 in which regions 14 of relatively small diameter alternate with regions 16 of relatively large diameter. Hollow member 10 also has tubular ends 18 and 20, each having the same internal diameter as that of the regions 14 of corrugated portion 12. Surrounding the tubular ends 18 and 20 are external flanges 22 and 24, respectively, by which the assembly is attached to pipes 26 and 28 at either end by bolts 30. Within tubular ends 18 and 20 and attached to the periphery thereof are the tubular liners 32 and 34, respectively.

The liner 32 has a short cylindrical portion 36 having the same external diameter as the interior diameter of tubular end 18 and a long cylindrical portion 38 smaller in diameter than portion 36, extending into second tubular end 20 and forming an annular chamber 40 between the liner 32 and corrugated portion 12 of hollow member 10. A short conical portion 42 joins cylindrical portions 36 and 38 and contains a plurality of passages 44 about its periphery.

The liner 34 has a short cylindrical portion 46 having the same external diameter as the interior of second tubular end 20 and a longer cylindrical portion 48 smaller in diameter than portion 46. Portion 48 is spaced slightly from corrugated portion 12 of hollow member 10 and is joined to portion 46 by short conical portion 50. Portion 48 overlaps and surrounds the end of second portion 38 of liner 32 and is radially spaced therefrom so that annular opening 52 is formed between the two liners.

Liquid such as hot water is assumed to flow through the present assembly from left to right as viewed in the figure. The greater portion of the fluid will go through the liner 32. The remainder will pass through the openings 44 in the liner 32 into the space 40 between the liner 32 and the member 10 and will exit through the opening 52 between the liners 32 and 34. The said remainder of the liquid flowing through the space 40 sweeps the gas out of this space, so that the space is filled or nearly filled with water. Thus the collection of gas in the top region of the corrugated portion 12 of the member 10 is avoided, with the result that severe unbalanced vibrations tending to cause failure of the member 10 are avoided.

The annular opening 52 formed between the liners 32 and 34 contributes to the suppression of gas in the annular space 40. The radial thickness of the opening 52 must be sufficiently small that pressure in the space 40 is relatively high and the water, which may be very hot, does not vaporize into steam in the space 40.

The radial thickness of annular opening 52 and size and number of openings 44 in the liner 32 must be so chosen that the column of liquid through the opening 52 has about half the velocity of the liquid exiting from the interior of the liner 32. It is important that the annular opening 52 be spaced radially inward from the inner surfaces of pipe 28 and portion 46 of liner 34. Thus there is a good velocity gradient between zero velocity of the liquid at the inner surface of the pipe 28, intermediate velocity at the annular opening 52, and full velocity at the center of the pipe 28. Thus the stresses due to liquid turbulence are avoided in the assembly of the present invention.

The embodiments of the invention in which an exclusive property or privilege is claimed are defined as follows:

1. A flexible bellows assembly for the passage of liquids which may volatilize within the assembly comprising:
    (a) a hollow expanso-contractable member having a relatively long transversely corrugated portion in which regions of relatively small internal diameter alternate with portions of relatively large internal diameter, the member having a first tubular end and a second tubular end;

(b) a first tubular liner within said member having a flow passage therethrough, one end of said liner engaging said first tubular end of said hollow member about the inner periphery thereof and the other end of said liner extending into said second tubular end of said member, said liner being spaced from said corrugated portions and forming an annular chamber therewith, said liner containing a plurality of passages passing therethrough about its periphery near its said one end; and (c) a second tubular liner within said member, said second liner having a larger diameter than said first liner, one end of said liner engaging said second tubular end of said hollow member about the inner periphery, the other end of said liner overlapping and surrounding the other end of said first liner in spaced relationship to form an annular opening between the two said liners which communicates with said plurality of passages and said flow passage.

2. The assembly of claim 1 wherein:

(a) the tubular ends have the same diameter as the regions of the corrugated portion having a relatively small internal diameter;

(b) the first liner consists of a relatively short cylindrical first portion having the same external diameter as the internal diameter at said tubular ends of said hollow member, a relatively long cylindrical second portion, said first and second portions being joined by a short conical portion, said second portion being smaller in diameter than said first portion and spaced from said corrugated portion of said hollow member to form an annular chamber between said second portion and said corrugated portion; and (c) the second liner consists of a relatively short cylindrical portion having the same external diameter as the internal diameter at said tubular ends of said hollow member, a longer cylindrical second portion, said portions being joined by a short conical section, said second portion being smaller in diameter than said first portion and spaced from said bellows and larger in diameter than said second portion of said first liner and overlapping and surrounding the said second portion of said first liner and spaced therefrom to form an annular opening between the two said liners.

References Cited

UNITED STATES PATENTS 2,616,728  11/1952  Pitt _____ 285—300 X

FOREIGN PATENTS 658,505  10/1951  Great Britain.

REINALDO P. MACHADO, Primary Examiner

D. W. AROLA, Assistant Examiner